United States Patent
Kobayashi et al.

(10) Patent No.: US 6,347,427 B2
(45) Date of Patent: *Feb. 19, 2002

(54) WIPER DEVICE FOR VEHICLE

(75) Inventors: Toshio Kobayashi; Masami Goto; Hiroshi Ohsaki; Hiroshi Kojima; Masaaki Shimuba, all of Kanagawa-ken (JP)

(73) Assignees: Nissan Motor Co., Ltd.; Jidosha Denki Kogyo Kabushiki Kaisha, both of Yokohama (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/190,059

(22) Filed: Nov. 12, 1998

(30) Foreign Application Priority Data

Nov. 11, 1997 (JP) .............................................. 9-308953

(51) Int. Cl.⁷ .................................................. B60S 1/06
(52) U.S. Cl. ................................ 15/250.31; 15/250.34; 403/DIG. 3; 411/517
(58) Field of Search .......................... 15/250.31, 250.3, 15/250.001, 250.34; 411/517; 403/DIG. 3, DIG. 4, 263, 241

(56) References Cited

U.S. PATENT DOCUMENTS 5,067,198 A * 11/1991 Ishikawa et al. .......... 15/250.31
5,337,439 A * 8/1994 Frey et al. ................ 15/250.31
5,735,171 A * 4/1998 Moote et al. ............. 15/250.31

FOREIGN PATENT DOCUMENTS

JP 5-270362 10/1993

* cited by examiner

Primary Examiner—Gary K. Graham
(74) Attorney, Agent, or Firm—Foley & Lardner

(57) ABSTRACT

A wiper device for a vehicle disclosed is provided with a wiper motor, a wiper pivot connected to the wiper motor, and a pivot holder having a base portion attached to the vehicle body and a bearing hole pivotally supporting the wiper pivot in a rotatable manner. Here, the wiper pivot can rotate around the pivot axis thereof by using a drive force from the wiper motor and has a cutout portion, and the wiper pivot extends so as to project toward an outer side of the vehicle body. In such a structure, it is further structured such that a C ring engaged with the cutout portion of the wiper pivot is released from the cutout portion when a load equal to or more than a predetermined value acts on the wiper pivot. In this case, as a result, the wiper pivot is moved to an inner side of the vehicle body.

10 Claims, 1 Drawing Sheet

WIPER DEVICE FOR VEHICLE

The contents of Application No. TOKUGANHEI 9-308953, with a filing date of Nov. 11, 1997 in Japan, are hereby incorporated by reference.

BACKGROUND OF THE INVENTION

1. Field of the Invention

The present invention relates to a wiper device for a vehicle, and particularly to a wiper device for a vehicle preferably usable for a vehicle provided with a structure of a so-called concealed wiper type in which an upper portion of a wiper unit is covered with a rear end portion of an engine hood.

2. Description of the Related Art

In a vehicle provided with the structure of the so-called concealed wiper type disclosed in Japanese Patent Application Laid-Open Publication No. 5-270362, an end portion of an engine hood extends outwardly near a lower side portion of a front window panel, thereby covering an upper portion of a wiper unit.

However, in such a structure, since the rear end portion of the engine hood becomes close to the upper end portion of a wiper pivot of the wiper unit, the rear end portion of the engine hood is brought into contact with the wiper pivot when a collision load acts on the rear end portion of the engine hood from the upper side of the vehicle body downward to the lower side of the vehicle body at a time of collision of the vehicle or the like, so that the engine hood tends to be prevented from freely deforming downward. That is, such a restriction of the deformation corresponds to a restricting condition in the case of desiring to increase an absorption amount of the collision energy.

SUMMARY OF THE INVENTION

An object of the present invention is to provide a wiper device for a vehicle which can improve an absorption characteristic of a collision energy without substantially restricting a deformation of a rear end portion of an engine hood to a lower side of a vehicle body by means of a wiper pivot when a load due to a collision or the like acts on the rear end portion of the engine hood from an upper side of the vehicle body (corresponding to an outer side of the vehicle body) to the lower side of the vehicle body (corresponding to an inner side of the vehicle body).

That is, the wiper device for the vehicle in accordance with the present invention is provided with a wiper motor, a wiper pivot connected to the wiper motor, and a pivot holder having a base portion attached to the vehicle body and a bearing hole pivotally supporting the wiper pivot in a rotatable manner.

In this case, the wiper pivot can rotate around the pivot axis by use of a drive force from the wiper motor, and the wiper pivot extends so as to project toward the outer side of the vehicle body and has a cutout portion, that is, a groove portion. Further, a C ring is attached so as to be engaged with the cutout portion of the wiper pivot.

In the structure mentioned above, it is further constructed such that the C ring engaged with the cutout portion is expanded so as to move apart from the cutout portion when a load equal to or more than a predetermined value acts on the wiper pivot due to a collision or the like, thereby moving the wiper pivot to the inner portion of the vehicle body.

Accordingly, in the wiper device for the vehicle in accordance with the present invention, when the load due to a collision or the like acts on the rear end portion of the hood member typically corresponding to an engine hood from the outer side of the vehicle to the inner side thereof, and more particularly, from the upper side of the vehicle body to the lower side thereof, a deformation of the rear end portion of the hood member to the lower side of the vehicle body is substantially made free by means of the wiper pivot structured in the above manner, thereby improving the absorption characteristic for the collision energy in the case of a collision or the like. Here, with respect to the absorption of the energy applied at a time of a collision or the like, the energy absorption is caused not only by a slide resistance when the wiper pivot is released from the pivot holder but also at a time of the expanding motion of the C ring.

In this case, more specifically, the wiper pivot is covered with the hood member typically corresponding to the engine hood in the outer side of the vehicle, and the load at a time of a collision or the like acts on the wiper pivot through the hood member.

Here, in the wiper device for the vehicle in accordance with the present invention, particularly, it is preferable that the C ring has a substantially circular cross sectional shape for a simplicity of the structure and a reliability of the expansion motion thereof. And the substantially circular cross sectional shape includes an oval cross sectional shape capable of performing substantially the same expansion motion as well as the circular shape.

Further, in the wiper device for the vehicle in accordance with the present invention, particularly, it is preferable to structure such that the cutout portion is provided in a portion of the wiper pivot projecting to the upper side of the vehicle body from the pivot holder, at least a wall surface of the cutout portion positioned in the upper side of the vehicle body is a surface inclined to the upper side of the vehicle body from a bottom portion of the cutout portion, and the C ring is deformed to be expanded in such a manner that it moves apart from the cutout portion so as to move the wiper pivot to the lower side of the vehicle body when the load equal to or more than the predetermined value acts on the wiper pivot, because the inclined wall surface surely generates a guide effect when the C ring is expanded. Of course, also in this case, generally, the outer side of the vehicle body corresponds to the upper side of the vehicle body, and the inner side of the vehicle body corresponds to the lower side of the vehicle body.

Further, as the cutout portion, the structure having a substantially V-shaped cutout shape is preferable for a simplicity on manufacturing and a reliability of the expansion motion.

DETAILED DESCRIPTION OF THE PREFERRED EMBODIMENT

An embodiment in accordance with the present invention will be described in detail with respect to the drawings.

Figure 1:
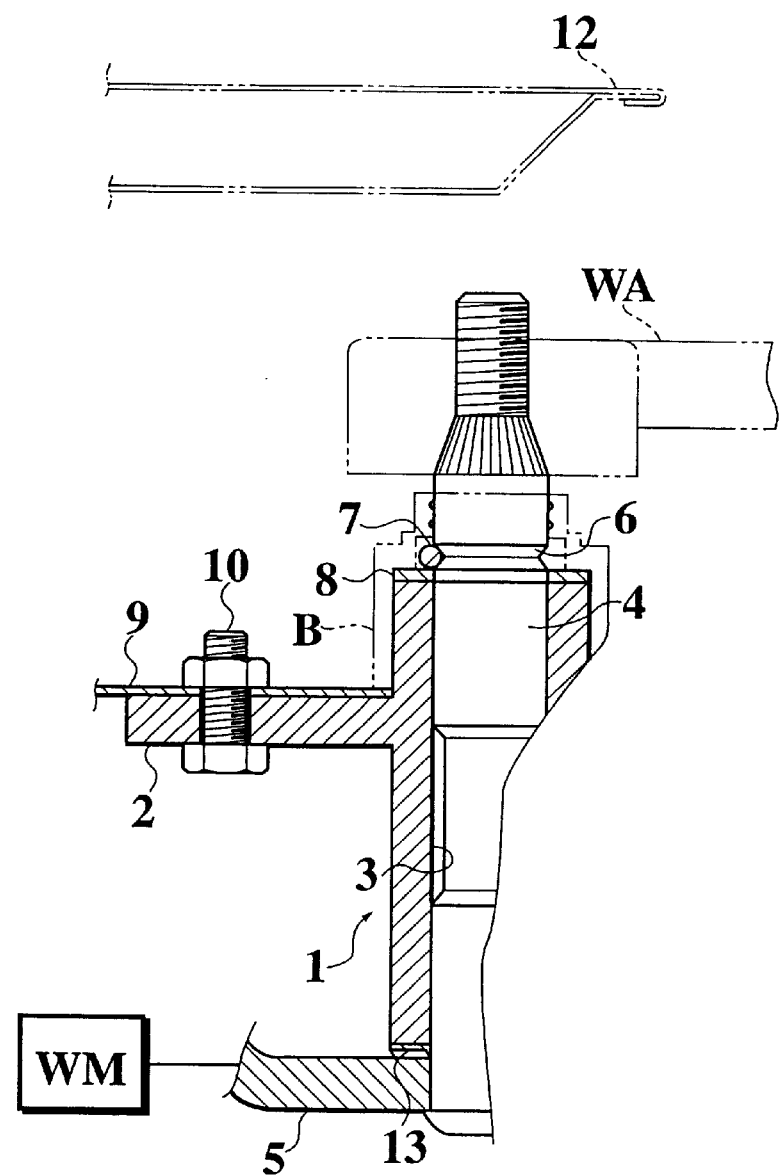
FIG. 1 is a cross sectional view which shows a state of attaching a pivot holder of a wiper unit of a wiper device for a vehicle in accordance with an embodiment of the present invention to a vehicle body.

In FIG. 1, a pivot holder 1 of a wiper unit of a wiper device for a vehicle in accordance with this embodiment is provided with a base portion 2 and a bearing hole 3 corresponding to a hole provided in the base portion 2, and the base portion 2 is overlapped with a back surface of a vehicle body panel, for example, a cowl top panel 9 and fastened and fixed to the cowl top panel 9 by a bolt and a nut 10.

Then, a wiper pivot 4 is pivotally supported to the bearing hole 3 in a rotatable manner. That is, the wiper pivot 4 is rotatable around its pivot axis corresponding to a central axis of the wiper pivot 4, extending along a vertical direction in FIG. 1, of the wiper pivot 4.

And, the wiper pivot 4 is inserted to the bearing hole 3 from its lower side, a come-out prevention of the wiper pivot 4 is performed at an upper end portion of the bearing hole 3 through a C ring 7 and a washer 8, and a wiper arm WA is connected to an upward projecting end portion of the wiper pivot 4.

Further, a pivot arm 5 connected to a wiper motor WM through a drive transmission link (not shown) is caulked and fixed to a lower end portion of the wiper pivot 4, and reference 13 denotes a spring washer elastically provided between the pivot holder 1 and the pivot arm 5 and reference symbol B denotes a sealing boot attached so as to cover an arrangement portion such as the C ring and the like.

Here, a structure of preventing the wiper pivot 4 from coming out will be described in detail.

At first, an annular cutout (an annular groove) 6 is formed in a portion of the wiper pivot 4 adjacent to an upper hole edge portion of the bearing hole 3, so that the wiper pivot 4 is prevented from coming out by attaching the C ring 7 to the annular cutout 6 so as to engage with the annular cutout 6 and also engaging the C ring 7 with the a washer 8 seated on the upper hole edge portion of the bearing hole 3.

Figure 2:
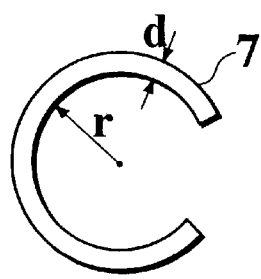
FIG. 2 is a plan view of a C ring of the pivot holder of the wiper unit in accordance with this embodiment.

The C ring 7 mentioned above is formed in a circular cross sectional shape as shown in FIG. 1, and each of a diameter d and an inner radius r thereof as shown in FIG. 2 is set to be a predetermined value taking a width and a depth of the annular cutout 6 into consideration.

In the mean time, the annular cutout 6 is structured such that a cutout shape (groove shape) thereof is formed in a substantially V shape and an upper cutout wall of the annular cutout 6 in the wiper pivot 4 becomes an upward inclined surface, that is, a surface having an angle of elevation in the case of seeing in a horizontal direction from a bottom portion of the V-shaped annular cutout 6 as shown FIG. 1. In this embodiment, a lower cutout wall of the annular cutout 6 is formed in such a manner that it is symmetrical to the upper cutout wall as shown FIG. 1, however, of course, this symmetrization is not always required.

Then, as a result, a come-out prevention is performed in such a manner that the C ring 7 is expanded so as to be released from the annular cutout 6 with respect to a load equal to or more than a predetermined value acting on the wiper pivot 4 from an upper side to a lower side along a direction of the pivot axis corresponding to a direction directing from the above to the below in FIG. 1, so that the wiper pivot 4 can be released from the bearing hole 3 of the pivot holder 1.

In the case of applying the wiper device for the vehicle having the wiper unit structure in the above manner to the vehicle provided with the structure of the concealed wiper type, since a rear end portion of an engine hood 12 extends so as to come near a lower portion of a front window panel (not shown), the upper portion of the wiper unit is covered with the rear end portion of the engine hood 12, and the upper end portion of the wiper pivot 4 is going to come near a lower surface of the rear end portion of the engine hood 12.

Here, when a collision load acts the rear end portion of the engine hood 12 downward from the upper side at a time of collision of the vehicle, the rear end portion of the engine hood 12 deforms downward and interferes with the upper end of the wiper pivot 4.

Then, the load equal to or more than the predetermined value due to the collision of the vehicle acts on the wiper pivot 4 along the direction of the pivot axis thereof, that is, in a direction from the upper side corresponding to the outer side of the vehicle body to the lower side corresponding to the inner side of the vehicle body (a direction directing downward from the above in FIG. 1), so that an inner peripheral portion of the C ring 7 preventing the wiper pivot 4 from coming out is pressed to the upper hole edge of the bearing hole 3, namely, to an inner peripheral edge portion of the washer 8 and the upper cutout wall of the annular cutout 6.

Then, the C ring 7 slides so as to be expanded in an outer direction of its radius with respect to the inner peripheral edge portion of the washer 8 and the upper cutout wall of the annular cutout 6, and next, the C ring 7 is released from the annular cutout 6.

As a result, the wiper pivot 4 slides downward substantially along the direction of the pivot axis thereof so as to move downward for being released from the pivot holder 1.

Accordingly, a downward deformation of the rear end portion of the engine hood 12 is made free, a collapsing deformation stroke of the rear end portion of the engine hood 12 is surely increased, and an absorption characteristic for a collision energy can be efficiently improved.

Further, in this embodiment, since the collision energy can be absorbed by the expansion and deformation effect of the C ring 7 when the C ring 7 is expanded for being released from the annular cutout 6, the absorption characteristic for the collision energy can be more improved.

Still further, in this embodiment, since the releasing load of the C ring 7 can be easily adjusted by setting each of its diameter, its inner radius, a width of the annular cutout 6, a depth of the annular cutout 6 and the like, or a combination thereof, the absorption characteristic for the collision energy can be simply tuned.

Then, still further, in this embodiment, since the cutout shape of the annular cutout 6 is formed in the substantially V shape and the upper cutout wall of the annular cutout 6 is formed as the upward inclined surface, the inner peripheral portion of the C ring 7 can slide on the inclined surface so as to be easily released from the annular cutout 6, as well as the expansion guide effect of the C ring 7 can be obtained by the inclined surface, so that the downward moving operation of the wiper pivot 4 can be smoothly performed.

In addition, in this embodiment, the C ring 7 has the substantially circular cross sectional shape, however, of course, the structure is not limited to this, and may be shaped so as to realize the expansion motion in the same manner, for example, the C ring 7 has an oval cross sectional shape. Of course, also in this case, the releasing load will be set by suitably setting a major diameter of the C ring, a minor diameter of the C ring, an inner radius of the C ring, the width of the annular cutout 6, the depth of the annular cutout 6 and the like, or a combination thereof.

What is claimed is:

1. A wiper device for a vehicle, comprising:
   a wiper motor;
   a wiper pivot having a cutout portion, said wiper pivot being operatively connected to said wiper motor, said wiper motor being adapted to rotate said wiper pivot around a pivot axis thereof;

a pivot holder having a base portion which is adapted to be attached to a vehicle body and which includes a bearing hole that has an upper edge portion and which rotatably supports said wiper pivot, said wiper pivot having a portion extending outwardly from said pivot holder, said cutout portion being formed in the portion of said wiper pivot portion which extends outwardly from said pivot holder so that the cutout portion is located outside of said vehicle body, and a C ring having an essentially circular cross section, said C ring being disposed in said cutout portion and in contact with an inclined wall surface of said cutout portion opposite the upper edge portion, said C ring being so constructed and arranged that when a load equal to or more than a predetermined value acts on said wiper pivot, said C ring expands to move apart from said cutout portion and allows said wiper pivot to move into said pivot holder and into an inner side of the vehicle body.

2. A wiper device for a vehicle as claimed in claim 1, wherein at least a side wall surface of said cutout portion is angled relative to the pivot axis.

3. A wiper device for a vehicle as claimed in claim 2, wherein said cutout portion has a substantially V cutout shape.

4. A wiper device for a vehicle as claimed in claim 1, wherein said C ring is so constructed and arranged that when a load equal to or greater than a predetermined value acts on said wiper pivot, said C ring expands and becomes permanently disengaged from said cutout portion and allows said wiper pivot to move into said pivot holder in a direction toward an inner side of the said vehicle body.

5. A wiper device for a vehicle comprising:
a wiper motor;
a wiper pivot having a cutout portion, said wiper pivot being operatively connected to said wiper motor, said wiper motor being adapted to rotate said wiper pivot around a pivot axis thereof;
a pivot holder having a base portion which is adapted to be attached to a vehicle body and which includes a bearing hole that has an upper edge portion and which rotatably supports said wiper pivot, said wiper pivot having a portion extending outwardly from said pivot holder, the cutout portion being formed in the portion of said wiper pivot portion which extends outwardly from said pivot holder so that the cutout portion is located outside of said vehicle body, and
a C ring disposed in said cutout portion so as to be in contact with an inclined wall surface of the cutout portion which is opposite the upper edge portion, said C ring being so constructed and arranged that when a load equal to or more than a predetermined value acts on said wiper pivot, said C ring expands to move apart from said cutout portion and allows said wiper pivot to move into said pivot holder and into an inner side of the vehicle body; and
wherein said C ring has a substantially circular cross section.

6. A combination of a wiper device and a vehicle comprising:
a vehicle body;
a wiper motor;
a wiper pivot connected to said wiper motor, said wiper motor being adapted to rotate said wiper pivot around a pivot axis thereof, said wiper pivot having a cutout portion;
a pivot holder having a base portion attached to said vehicle body and a bearing hole that includes an upper edge portion, the bearing hole rotatably supporting said wiper pivot, said wiper pivot having a portion extending outwardly from said pivot holder; and
a C ring having an essentially circular cross section disposed in said cutout portion of said wiper pivot so as to be in contact with an inclined wall surface of said cutout portion which is opposite the upper edge portion of the bearing hole,
wherein said cutout portion is located outside of said vehicle body, and when a load equal to or more than a predetermined value acts on said wiper pivot, said C ring expands to move apart from said cutout portion, and allows said wiper pivot to move from outside of the vehicle body through said pivot holder into an inner side of the vehicle body; and
wherein an outer end portion of said wiper pivot which is outside of the vehicle body, is covered with a hood member of said vehicle body, and said load acts on said wiper pivot through engagement between said hood member and the outer end portion of said wiper pivot.

7. A combination of a wiper device and a vehicle as claimed in claim 6, wherein when a load equal to or greater than a predetermined value acts on the said wiper pivot, said C ring expands to be permanently released from said cutout portion, and allows said wiper pivot to move through said pivot holder in a direction of the inner side of said vehicle body.

8. A combination of a wiper device and a vehicle, comprising:
a vehicle body;
a wiper motor;
a wiper pivot connected to said wiper motor, said wiper motor being adapted to rotate said wiper pivot around a pivot axis thereof, said wiper pivot having a cutout portion;
a pivot holder having a base portion attached to said vehicle body and a bearing hole including an upper edge portion and rotatably supporting said wiper pivot, said wiper pivot having a portion extending outwardly from said pivot holder; and
a C-ring having an essentially circular cross section disposed in the cutout portion of said wiper pivot and in contact with an inclined wall portion of the cut out portion opposite the upper edge portion of the bearing hole,
wherein said cutout portion is located outside of said vehicle body, and when a load equal to or more than a predetermined value acts on said wiper pivot, said C ring expands to move apart from said cutout portion, and allows said wiper pivot to move from outside of the vehicle body through said pivot holder into an inner side of the vehicle body.

9. A combination of a wiper device and a vehicle as claimed in claim 8, wherein when a load equal to or greater than a predetermined value acts on the said wiper pivot, said C ring expands to be permanently released from said cutout portion, and allows said wiper pivot to move through said pivot holder in a direction of the inner side of said vehicle body.

10. A wiper device for a vehicle, comprising:
a wiper pivot operatively connected to a wiper motor;
a pivot holder having a base portion attached to said vehicle body and a bearing hole including an upper edge portion and rotatably supporting said wiper pivot, said wiper pivot having a portion extending outwardly from said pivot holder; and
energy impact absorbing means for absorbing collision energy, comprising a C ring which has an essentially circular cross section, which is disposed in a groove which has inclined sides and which is formed in said wiper pivot, and which maintains said wiper pivot in a predetermined position with respect to said pivot holder, said C ring expanding and deforming to absorb collision energy when the wiper pivot is forced from said predetermined position in a direction into the vehicle by a collision.

* * * * *